(12) United States Patent
Currivan

(10) Patent No.: US 7,384,212 B2
(45) Date of Patent: Jun. 10, 2008

(54) SEPTIC SYSTEM

(76) Inventor: Frank Currivan, 12 Perna La., Riverside, CT (US) 06878

( * ) Notice: Subject to any disclaimer, the term of this patent is extended or adjusted under 35 U.S.C. 154(b) by 64 days.

(21) Appl. No.: 11/235,405

(22) Filed: Sep. 26, 2005

(65) Prior Publication Data

US 2007/0071555 A1    Mar. 29, 2007

(51) Int. Cl.
*E02B 11/00* (2006.01)
*E02B 13/00* (2006.01)

(52) U.S. Cl. .............. 405/43; 405/45; 405/46; 405/49

(58) Field of Classification Search .......... 405/43–49, 405/52, 53
See application file for complete search history.

(56) References Cited

U.S. PATENT DOCUMENTS

| | | | | |
|---|---|---|---|---|
| 3,220,194 A | * | 11/1965 | Lienard | 405/45 |
| 3,401,526 A | * | 9/1968 | Rodgers, III | 405/45 |
| 3,645,100 A | * | 2/1972 | La Monica | 405/46 |
| 3,820,341 A | * | 6/1974 | Richard et al. | 405/46 |
| 4,145,157 A | * | 3/1979 | Lascelles | 405/43 |
| 4,192,628 A | * | 3/1980 | Gorman | 405/45 |
| 4,588,325 A | | 5/1986 | Seefert | 405/46 |
| 4,759,661 A | | 7/1988 | Nichols et al. | 405/48 |
| 4,824,287 A | | 4/1989 | Tracy | 405/36 |
| 5,015,123 A | * | 5/1991 | Houck et al. | 405/45 |
| 5,401,116 A | | 3/1995 | Nichols | 405/48 |
| 5,441,363 A | | 8/1995 | Gray | 405/49 |
| 5,498,104 A | | 3/1996 | Gray | 405/43 |
| 5,511,903 A | | 4/1996 | Nichols et al. | 405/43 |
| 5,556,231 A | | 9/1996 | Sidaway et al. | 405/48 |
| 5,588,778 A | | 12/1996 | Nichols et al. | 405/48 |
| 5,810,509 A | * | 9/1998 | Nahlik, Jr. | 405/43 |
| 5,890,837 A | * | 4/1999 | Wells | 405/43 |
| 5,890,838 A | | 4/1999 | Moore, Jr. et al. | 405/49 |
| 6,076,993 A | | 6/2000 | Gray | 405/43 |
| 6,267,882 B1 | * | 7/2001 | Houck et al. | 405/43 |
| 6,312,190 B1 | * | 11/2001 | Goughnour | 405/36 |
| 6,361,248 B1 | | 3/2002 | Maestro | 405/49 |
| 6,443,652 B1 | | 9/2002 | Houck et al. | 405/46 |
| 6,612,777 B2 | | 9/2003 | Maestro | 405/49 |
| 6,679,653 B1 | | 1/2004 | DiTullio | 405/49 |
| 6,854,925 B2 | | 2/2005 | DiTullio | 405/49 |

* cited by examiner

*Primary Examiner*—Frederick L Lagman
(74) *Attorney, Agent, or Firm*—Ohlandt, Greeley, Ruggiero & Perle, L.L.P.

(57) ABSTRACT

A modular appendage for a septic gallery has a first modular section for connection to a lateral side of the gallery with the first modular section having a number of apertures thereon. The first modular section has a first area. The lateral side of the septic gallery has a second area. The first area is greater than the second area for increased drainage and thus adds capacity to the gallery.

25 Claims, 5 Drawing Sheets

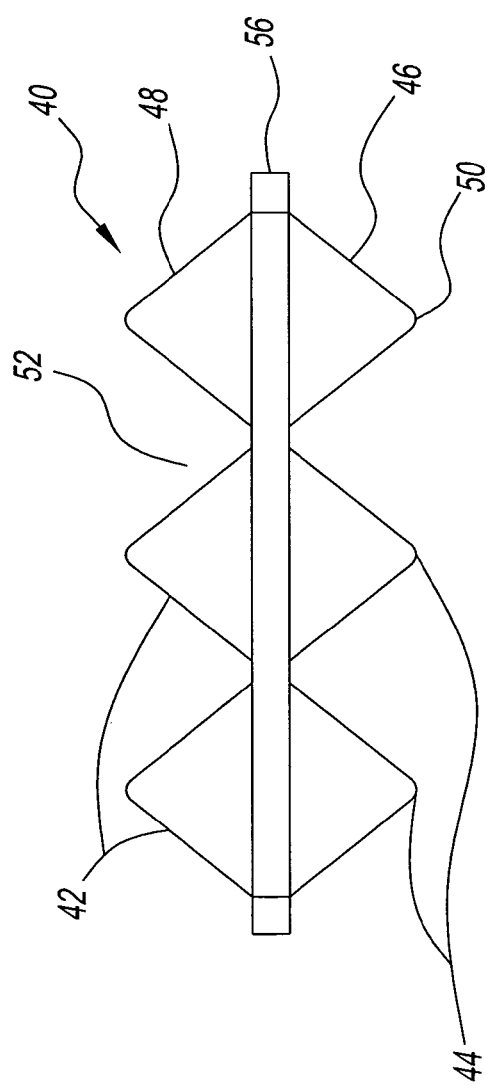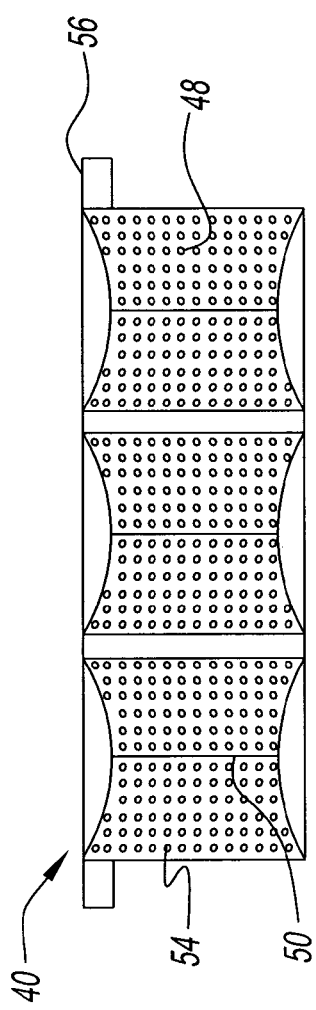
Fig. 5
Fig. 6

SEPTIC SYSTEM

BACKGROUND OF THE INVENTION

1. Field of the Invention

The present invention relates to a septic system for handling household waste water. More particularly, the present invention relates to a septic system that can expand the amount of filtering material around or adjacent to a conventional new or existing septic gallery to expand a septic gallery capacity.

2. Description of the Related Art

Septic systems are well known in the art. One such septic system is disclosed in U.S. Pat. No. 4,759,661 to Nichols, et al. (hereinafter "Nichols"). Nichols discloses a leaching system conduit made from a thermoplastic member having lateral sidewalls with a number of apertures. The thermoplastic member is an arch shaped member in cross section and has the apertures for the passage of liquid therethrough. The lateral sidewalls also have a number of corrugations formed in a rectangular shaped manner.

Such septic systems are deficient in their operation. First of all, zoning ordinances for certain sized homes require larger septic systems. Such larger septic systems may not fit on the desired building lot. A large number of bedrooms in a new home construction require according to some zoning laws that a certain sized septic system be used or that the certain sized septic system have a predetermined volume. This can be problematic under certain circumstances because the desired septic system may not fit in a certain lot and the new home owner may be limited to only a second sized septic system that is less than desired. With this smaller septic system, the new home builder thus must reduced the size of the new home. Secondly, in other circumstances homeowners may wish to expand the capacity of the septic system in a retrofit manner from a first size to another second size to accommodate a larger home.

However, a known problem in the art is that the under this arrangement, the second sized larger septic system like Nichols' leaching system will require the homeowner to excavate the leaching system and remove the leaching system. Thereafter, the homeowner will have to remove additional soil and dirt and then insert a new second sized larger septic system. Thereafter, the homeowner may have to perform additional work to the home to accommodate the home with this replacement and further obtain all of the requisite permits and variances to the zoning laws.

Accordingly, there is a need for a septic system that increases an amount of filtering medium so smaller septic systems may be used with larger homes thus maintaining an amount of effluent entering the septic system. There is also a need for a septic system that does not require replacement of the entire septic system for an upgrade. There is also a need for a septic system that has a more productive filtering. There is a further need for a septic system that has an attachment that can expand a complementary filtering area of the septic system.

There is also a need for such a system that eliminates one or more of the aforementioned drawbacks and deficiencies of the prior art.

SUMMARY OF THE INVENTION

It is an object of the present invention to provide a septic system for a residential home or commercial building.

It is another object of the present invention to provide a septic system that can be connected in a modular fashion to an existing septic system.

It is yet another object of the present invention to provide a septic system that increases a surface area on a lateral side of an existing septic system.

It is still another object of the present invention to provide a device that adds capacity to an existing septic system.

It is still yet another object of the present invention to provide a septic system that has a large capacity in a smaller footprint or space underneath ground.

It is a further object of the present invention to provide a septic system that has a baffling arrangement on a lateral side for an improved interface with ground.

It is a further object of the present invention to provide a septic system that has a triangular baffling arrangement on a lateral side of an existing system for an improved interface with sand.

These and other objects and advantages of the present invention are achieved by a septic system of the present invention. The system has a modular appendage for a septic gallery and the appendage has a first modular section for connection to a lateral side of the gallery with the first modular section having a apertures thereon. The first modular section has a first area, and the lateral side of the septic gallery has a second area, with the first area greater than the second area of the gallery.

DESCRIPTION OF THE DRAWINGS

FIG. 5 illustrates a top plan view of two appendages of the present invention connected to each other without a septic gallery; and FIG. 6 illustrates a front view of the appendages of FIG. 5 of the present invention.

DETAILED DESCRIPTION OF THE INVENTION

Figure 1:
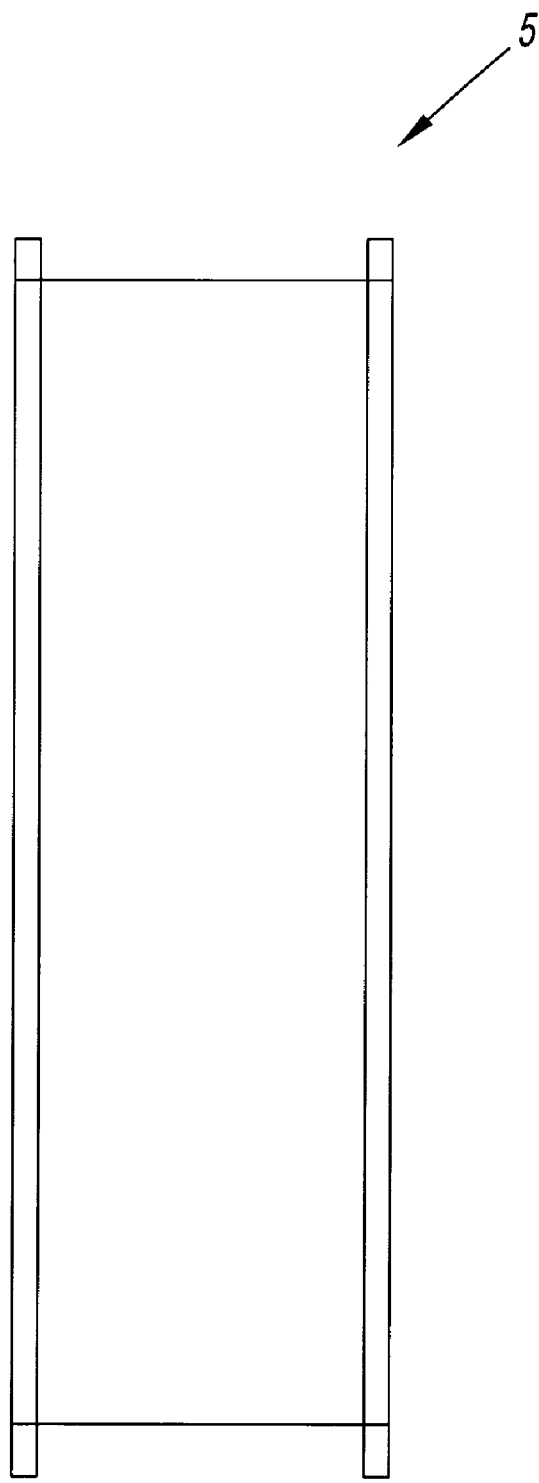
FIG. 1 illustrates a prior art septic gallery.

Referring to FIG. 1, there is shown a septic gallery 5 as is known in the art. The septic gallery 5 is preferably a container that is placed in a leaching field, such as ground or sand, and is utilized for drainage of effluent. Effluent is a term commonly used for waste materials such as liquid and solid industrial refuse or liquid and solid residential sewage that flows out of a source and is discharged into the environment. The effluent is carried from a source such as a bathroom to the septic tank, then to the leaching field for dispersion, diffusion, or percolation, into surrounding soil.

Known pipes carry the effluent discharge and release the material into a chamber, or vault such as the septic gallery 5. The gallery 5 as is known will have a number of perforation or holes leading from the septic gallery 5. The gallery 5 is usually buried in a trench to facilitate dispersion of the effluent into the soil. All of the solid effluent stays in the septic tank, and only the liquid and liquid effluent diffuses into the sand.

In some systems, the gallery 5 is defined by a large diameter perforated conduit. In other systems, the gallery 5 is perforated to provide direct dispersion into the sand. The effluent is then dispersed into the soil either through the soil serving as the floor of the gallery 5 or, when effluent accumulates in the gallery, through passages in side walls thereof.

One known problem in the art is that the interface between the gallery 5 and the ground only allows for a finite flow or dispersion rate of liquid waste from the gallery to the soil or sand on the other side. The inventor of the present invention has recognized this known problem and has solved the problem with the present invention that has a number of unexpected benefits that increase a capacity for liquid waste of the gallery 5, and allows an increased amount of liquid and liquid waste to diffuse into the ground.

A prior art septic gallery 5 is commonly concrete or formed of plastic resin material and corrugated for strength. This septic gallery 5 is formed in sections that are mated to vary the effective length of the leach field. Sometimes multiple septic galleries 5 are connected to one another to increase the length and capacity of the leaching field, for example a home.

Figure 2A:
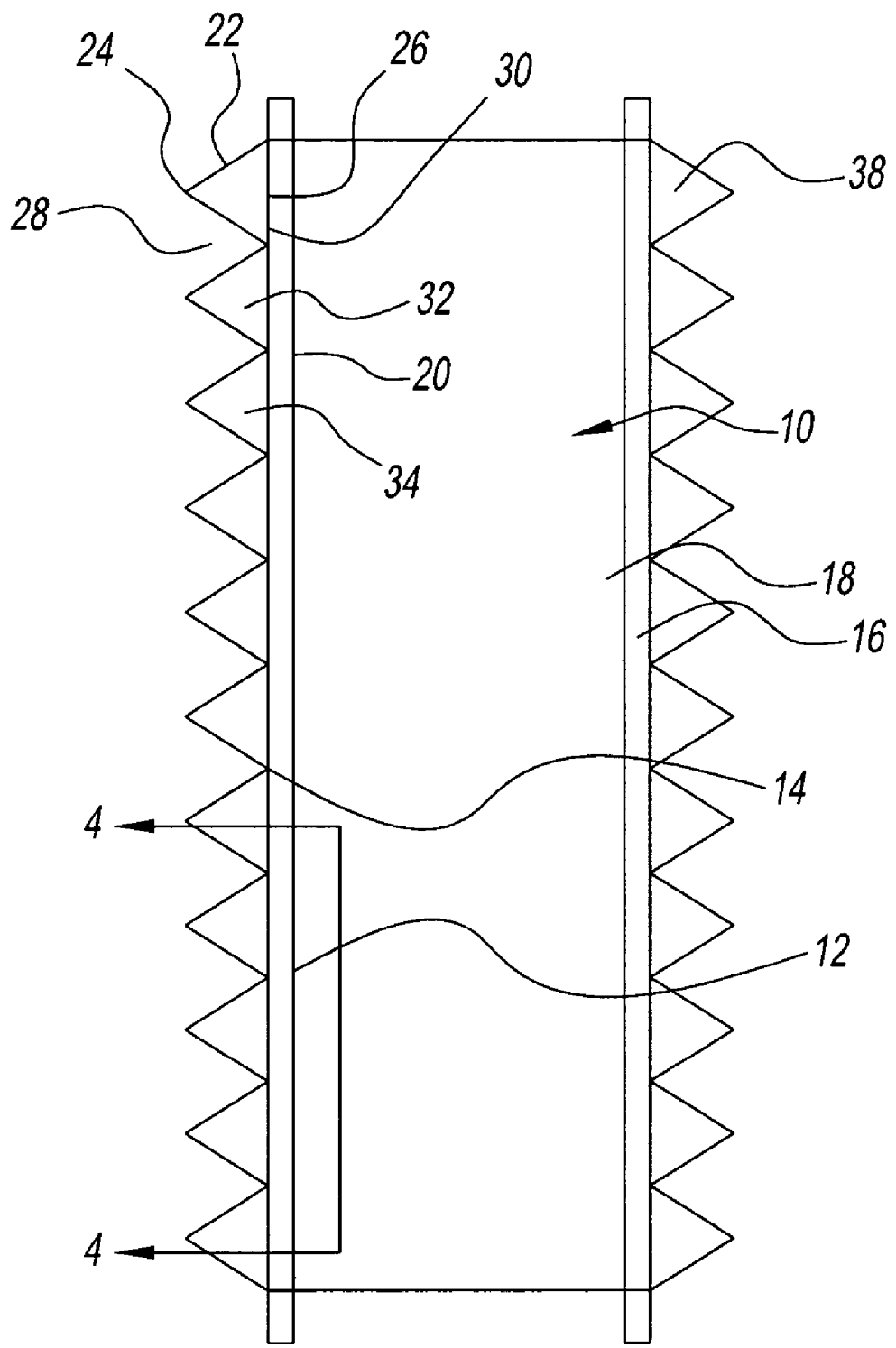
FIGS. 2*a* and 2*b* illustrate a top plan view of the appendages of the present invention connected to a septic gallery.

Referring now to FIG. 2a, there is shown the septic gallery 10 of the present invention buried beneath the ground. The septic gallery 10 is preferably connected to an effluent source, and has a first conduit 12 or pipe that is connected to a septic tank or pump chamber. In one embodiment, the septic gallery 10 has a four foot width although galleries can be provided in a variety of standard and/or conventional sizes to accommodate homes and or properties of differing sizes. The septic gallery 10 preferably has a first conduit 12 on a first side 14 of the gallery, and a second conduit 16 on a second side 18 of the gallery. The effluent is in a liquid form and preferably enters the gallery 10 from the first conduit 12 and the second conduit 16 to fill the gallery over time to capacity. Capacity is the number of gallons of effluent and depends on the size of the residence or waste source above ground. After a period of time, prior art galleries becomes full with liquid effluent, and must be replaced.

What is desirable is a device that may increase a capacity of the septic gallery while liquid effluent is not be stored therein. Instead, the liquid effluent is diffused to the surrounding environment to percolate through ground for filtering thereof. Most preferably, the present invention achieves this need in an unexpected manner.

The gallery 10 has a first appendage 20 on the first lateral side 14 of the gallery 10. Preferably, the first appendage 20 contacts the ground or sand in the ground contacting side, and also communicates with the first conduit 12 on the first side 14 of the gallery opposite the ground contacting side. The surrounding earth or sand presses appendage 20 to gallery 10. Alternatively, the appendage 20 and the gallery 10 may be formed as one integrated structure or as separate discrete pieces. The first appendage 20, in one embodiment, may be permanently connected to the septic gallery 10 by a connector. Alternatively, the first appendage 20 may be a modular member that is removably connected to the septic gallery 10, for easier replacement thereof.

Preferably, the first appendage 20 has a number of shaped members to permit enhanced diffusion of the effluent into the ground. The first appendage 20 has any acceptable shape to permit diffusion into the ground from the gallery 10 in a rapid manner. Preferably, the first appendage 20 has a number of three-sided or triangular shaped members generally represented by reference numeral 22 with each having an apex 24 and a base portion 26. Alternatively, the three-sided members could have a rounded tip instead of an apex. The triangular shaped members 22 collectively preferably form a baffle. Each member 22 is preferably a triangular member having two equal sides to form a substantially isosceles triangle. However, each member 22 can be a substantially equilateral triangle in which each angle includes approximately 60 degrees. Still further, each member 22 may be any three side polygonal member. Each member 22 is made from a material capable of withstanding the environment of the septic tank and gallery, such as, for example, a plastic resin material that would include resilient thermoplastic, polycarbonate, polyvinyl chloride (PVC), achrilonitride-butadiene-styrene (ABS), polyurethane, or acrylic resin.

In one non-limiting embodiment, the base portion 26 has a width of about one foot. A diffusion space 28 is formed between a first triangular member 30 and a second triangular 32 member of the baffle 22. The diffusion space 28 is also triangular shaped and is preferably allowed to fill in with an acceptable ground contacting material such as sand, gravel, or any combination thereof, for diffusion. Likewise, a second diffusion space 28 is formed between the second triangular member 32 and a third triangular member 34. This structure continues along the length of the septic gallery 10.

Figure 3:
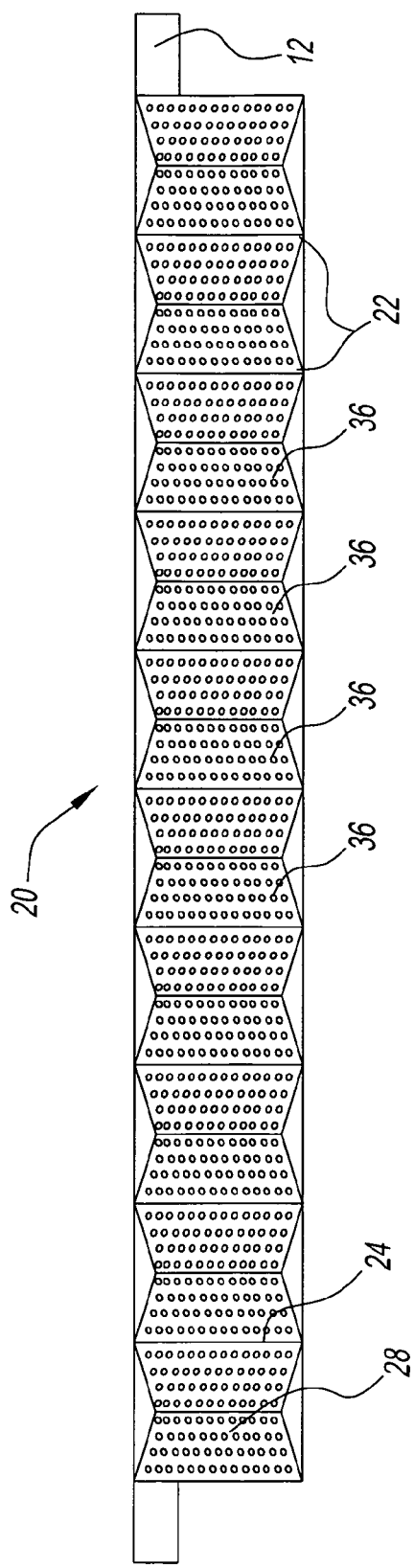
FIG. 3 illustrates a front view of the appendage for the septic gallery.

Referring to FIG. 3, there is shown a frontal view of the baffle with the diffusion spaces 28. The baffle 22 has a number of apertures 36 thereon. The liquid effluent preferably traverses through the apertures 36 and then diffuses into the soil, sand, gravel, or ground. The baffle 22 preferably increases a surface area of the lateral side of the first appendage 20 of the septic gallery 10 to allow an increased amount of liquid effluent to escape from the first appendage, and traverse through the apertures and for diffusion to the sand, or ground.

Figure 4:
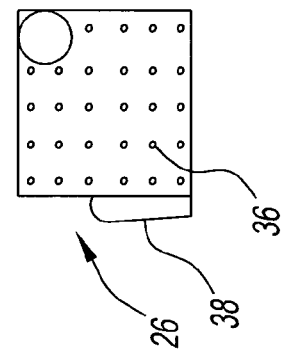
FIG. 4 illustrates a cross-sectional view of the septic gallery taken along line 3-3 of the gallery of FIG. 1.

Referring to FIG. 4, there is shown a cross sectional view of the first appendage 20 along line 4-4 of FIG. 2a. The base portion 26 of each triangular member of the baffle 22 has the apertures 36 in a configuration.

Figure 2B:
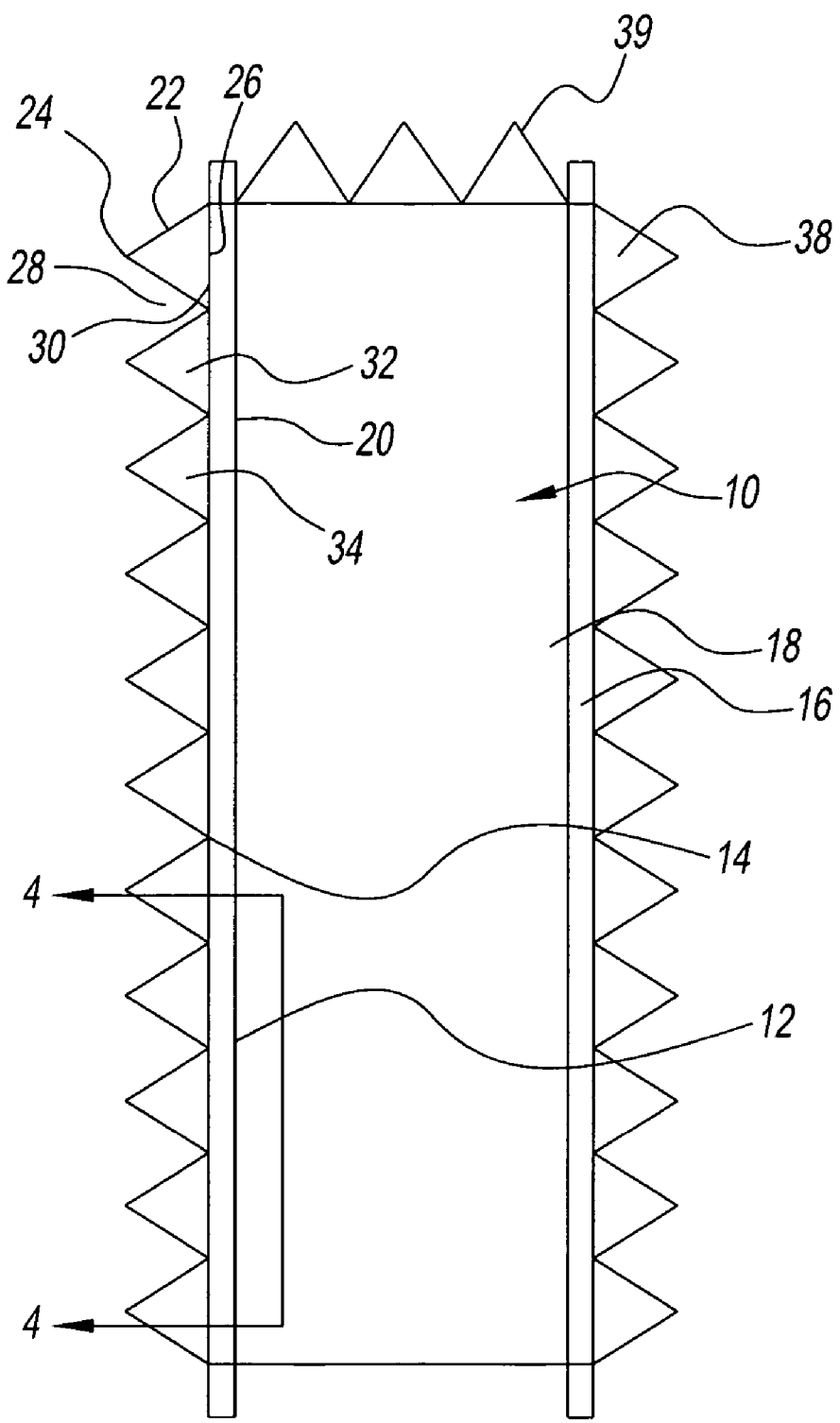

Preferably, the septic gallery 10 also has a second appendage 38 located on a second side 16 of the septic gallery 10 as shown in FIG. 1. Additionally, the first and the second appendages 20, 38 may form modular members to retrofit to an existing septic gallery 10 to increase a capacity thereof. Appendages 20 and 38 can be fabricated to accommodate existing and new galleries. Spaces between first and second appendages 20 and 38, respectively, can be filled with mason sand or any such material that can accept the fluid. Referring to FIG. 2b. gallery 10 could also have an additional third appendage 39 affixed to an end thereof to provide diffusion capability on three sides.

Referring to FIGS. 5 and 6, a second embodiment of an appendage system 40 of the present invention, is shown. System 40 has two appendages 42 and 44 that are abutting each other. Each appendage 42 and 44 can have any number of triangular elements 46 to form a baffle 48. Each baffle 48 has numerous apertures 54 to allow for passage of effluent into leaching field. Triangular elements 46 can have rounded tips 50 to further increase the surface area of diffusion of liquid into the soil 52 in the leaching field. Baffle 48 preferably increases a surface area of the lateral side of the first appendage 42 and 44 to allow an increased amount of liquid effluent to escape from the appendages and channel 56, and traverse through the apertures and for diffusion to the sand, or ground.

It should be understood that the foregoing description is only illustrative of the present invention. Various alternatives and modifications can be devised by those skilled in the art without departing from the scope of the present inven-

What is claimed is:

1. A modular appendage for a septic gallery having a lateral side with a second area, the modular appendage comprising:
   a first modular section for connection to the lateral side of the gallery, said first modular section having a plurality of apertures thereon, wherein said first modular section has a first area that is greater than said second area of the gallery.

2. The modular appendage of claim 1, wherein said first modular section may be stacked horizontally and connected to another second modular section.

3. The modular appendage of claim 1, wherein said first modular section may be stacked vertically and connected to another second modular section.

4. The modular appendage of claim 1, wherein said first modular section forms a plurality of triangular shaped members with each having an apex portion and a base portion.

5. The modular appendage of claim 4, wherein said plurality of triangular shaped members have said apex portion opposite said second area of the septic gallery, and wherein said base portion is connected to said second area of said septic gallery.

6. The modular appendage of claim 4, wherein said first modular section is made from a plastic resin material selected from the group consisting of resilient thermoplastic, polycarbonate, polyvinyl chloride (PVC), achrilonitride-butadiene-styrene (ABS), polyurethane and acrylic resin, and any combinations thereof.

7. The modular appendage of claim 4, wherein said first modular section has a plurality of triangular shaped members including a first triangular shaped member having a first apex or rounded tip and a second triangular shaped member having a second apex or rounded tip, wherein the first modular section has a space formed between said first apex and said second apex, said space being suitable to have earth disposed therein.

8. The modular appendage of claim 7, wherein said earth therein is selected from the group consisting of a filtering medium, sand, dirt, rock, gravel, an organic medium, an inorganic medium, an insulating material, and any compositions thereof.

9. A modular appendage for a septic gallery, said gallery having a first lateral side, a second lateral side being opposite said first lateral side and a third side perpendicular to said first side and said second side, the modular appendage comprising:
   a first modular section for connection to the first lateral side of the septic gallery, said first modular section having a plurality of apertures thereon, wherein said first modular section has a plurality of triangular shaped members; and
   a second modular section for connection to the second lateral side of the septic gallery, said second lateral side being opposite said first lateral side, said second modular section having said plurality of apertures thereon, and wherein said second modular section comprises said plurality of triangular shaped members, wherein said plurality of triangular shaped member forms a plurality of spaces therebetween, said plurality of spaces being suitable to insert a filtering material therein.

10. The modular appendage of claim 9, wherein said filtering material is selected from the group consisting of sand, dirt, rocks, gravel, an organic medium, an inorganic medium, an insulating material, and any combinations thereof.

11. The modular appendage of claim 9, further comprising third modular section for connection to said and a third side of the gallery, perpendicular to said first side and said second side, said third modular section being sized in a complementary manner to the septic gallery.

12. The modular appendage of claim 9, wherein said first modular section further comprises an intermediate member connected to said first lateral side of the septic gallery, said intermediate member having said plurality of apertures thereon, said plurality of apertures extending into both said plurality of triangular shaped members and the septic gallery.

13. The modular appendage of claim 12, wherein said second modular section further comprises a second intermediate member connected to said second lateral side of the septic gallery, said second intermediate member having said plurality of apertures thereon, said plurality of apertures extending into both said plurality of triangular shaped members and the septic gallery.

14. The modular appendage of claim 9, wherein said first modular section is retrofit to the septic gallery.

15. The modular appendage of claim 9, wherein second first modular section is retrofit to the septic gallery.

16. An appendage system for a leaching field comprising:
   a conduit having a first surface and a second surface and an interior for transporting an amount of effluent therein; and
   at least one filtering expansion device having a plurality of apertures adjacent one of said first surface or said second surface, said at least one expansion device for increasing an effective filtering area of said conduit at said first surface.

17. The appendage system of claim 16, wherein said at least one first filtering expansion device comprises a plurality of triangular shaped members each having an apex disposed opposite said interior.

18. The appendage system of claim 17, wherein at least a first apex of one of plurality of triangular shaped members is adjacent to a second apex of another of said plurality of triangular shaped members, said first apex and said second apex forming a space therebetween, said space being suitable for a filtering medium to be in said space.

19. The appendage system of claim 17, further comprising a second filtering expansion device, said second filtering expansion device being adjacent a surface of said conduit and opposite said first filtering expansion device.

20. The appendage system of claim 19, wherein said effluent conduit for delivering effluent is disposed between said first filtering expansion device and said second filtering expansion device.

21. The appendage system of claim 20, wherein said second filtering expansion device comprises a plurality of triangular shaped members each having an apex disposed opposite said interior.

22. An appendage for a septic gallery comprising:
   a first storage conduit having a first lateral side and a second lateral side and an interior for storing an amount of effluent therein
   a first filtering expansion device having a plurality of apertures connected to said first lateral side, said first expansion device for increasing an effective filtering area of the septic gallery at said first lateral side;
   a second filtering expansion device having a plurality of second apertures connected to said second lateral side, said second filtering expansion device for increasing said effective filtering area of the septic gallery at said second lateral side, wherein said first filtering expansion device and said second filtering expansion device are a plurality of modular triangular shaped members, wherein said plurality of modular triangular shaped members form a baffle structure, and wherein said plurality of modular triangular shaped members are stackable in a plurality of different positions.

23. A septic gallery for holding effluent comprising:
a container having a lateral side;
a plurality of triangular members on or in said lateral side, wherein each of said plurality of triangular members is an isosceles triangle, each of said isosceles triangles having a plurality of apertures therein for enhanced diffusion of the effluent.

24. The septic gallery of claim 23, wherein each of said plurality of triangular members is a three sided polygon removably connected to said lateral side with each having the same dimensions.

25. The septic gallery of claim 23, further comprising a conduit connected to said container and connected to said plurality of triangular members.

* * * * *